United States Patent
Duffield et al.

(10) Patent No.: US 7,469,420 B2
(45) Date of Patent: Dec. 23, 2008

(54) KEY TRANSPORT TAMPER PROTECTION

(75) Inventors: David Jay Duffield, Indianapolis, IN (US); Mark Alan Schulz, Indianapolis, IN (US); Michael Scott Deiss, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 700 days.

(21) Appl. No.: 10/514,968

(22) PCT Filed: May 9, 2003

(86) PCT No.: PCT/US03/14645

§ 371 (c)(1),
(2), (4) Date: Nov. 18, 2004

(87) PCT Pub. No.: WO03/107586

PCT Pub. Date: Dec. 24, 2003

(65) Prior Publication Data

US 2005/0163318 A1    Jul. 28, 2005

Related U.S. Application Data

(60) Provisional application No. 60/382,198, filed on May 21, 2002, provisional application No. 60/382,253, filed on May 21, 2002.

(51) Int. Cl.
*H04L 9/32* (2006.01)
*H04N 7/167* (2006.01)
(52) U.S. Cl. .............................. 726/26; 726/20; 726/27; 380/200; 380/201; 380/210

(58) Field of Classification Search ................... 713/176, 713/192–194; 380/200–203, 205, 44, 210; 726/26, 20, 31–33, 27; 725/30–31
See application file for complete search history.

(56) References Cited

U.S. PATENT DOCUMENTS 4,769,838 A    9/1988    Hasegawa (Continued)

FOREIGN PATENT DOCUMENTS

CN    1282489    1/2001

(Continued)

OTHER PUBLICATIONS

Search Report dated Sep. 28, 2003.

*Primary Examiner*—Hosuk Song
(74) *Attorney, Agent, or Firm*—Joseph J. Laks; Paul P. Kiel

(57) ABSTRACT

A method for protecting the digital output signal of a security module, comprising the steps of: receiving a scrambled digital signal from a source external to said security module, recovering at least one transport scramble control flag from the scrambled digital signal, descrambling said received scrambled signal to generate a descrambled signal, monitoring the at least one transport scramble control flag, generating a scrambling key in response to said monitored at least one transport scramble control flag, and scrambling said descrambled signal using said scrambling key to generate a re-scrambled signal. The present invention also includes a conditional access system comprising a host device and a security device coupled to the host device, such that the security device includes at least one transport scramble control flag modification circuit. By monitoring the transport scramble control flag as content passes through the security module, protection of the content can be securely maintained.

14 Claims, 2 Drawing Sheets

U.S. PATENT DOCUMENTS

| | | |
|---|---|---|
| 5,933,500 A | 8/1999 | Blatter et al. |
| 6,230,268 B1 * | 5/2001 | Miwa et al. ................ 713/176 |
| 6,385,727 B1 | 5/2002 | Cassagnol et al. |
| 6,681,015 B1 * | 1/2004 | Hioki et al. ................ 380/231 |

FOREIGN PATENT DOCUMENTS

| | | |
|---|---|---|
| WO | WO99/30499 | 6/1999 |

\* cited by examiner

KEY TRANSPORT TAMPER PROTECTION

RELATED APPLICATIONS

This application claims the benefit, under 35 U.S.C. § 365 of International Application PCT/US03/14645, filed May 9, 2003, which was published in accordance with PCT Article 21(2) on Dec. 24, 2003 in English and which claims the benefit of U.S. provisional patent application No. 60/382,198, filed May 21, 2002 and U.S. provisional patent application No. 60/382,253, filed May 21, 2002.

FIELD OF THE INVENTION

This present invention relates to protection of keys in a conditional access (CA) system, and in particular, to the protection of keys used for scrambling/descrambling in a CA system.

BACKGROUND OF THE INVENTION

A concern of today's emerging digital consumer electronics products is the ability to access a "plaintext" (i.e., 'in the clear') digital bitstream, thereby permitting one to make unauthorized digital copies of the bitstream. The National Renewable Security Standard (NRSS) (EIA-679) developed by the Electronic Industries Alliance provides a means for employing renewable security in connection with digital consumer electronics (CE) devices, for example, digital television receivers (DTVs), digital video cassette recorders (DVCRs) and set-top boxes (STBs). Renewable security allows for the development of conditional access systems that can be replaced, upgraded or recovered with minimum cost and effort.

Typically, a service provider will scramble the signal before it is transmitted or broadcast. A conditional access (CA) device (e.g., an NRSS smart card) may be used to descramble the signal and route it to the host device. However, a problem with the NRSS architecture is that the audio/visual (A/V) stream is sent to the host device (for example, a display device or a set top box) from the smart card needs to be protected. That is, the A/V stream needs to be scrambled when it leaves the CA device. Otherwise, a person can monitor this line and use a data capturing device to record all the data.

Thus, there is presently a need for a conditional access system which effectively protects the transmission channel from a conditional access device (e.g., smart card) to a host and/or display device (e.g., DTV, STB, etc.).

SUMMARY OF THE INVENTION

The present invention is a method for protecting the digital output signal of a security module. In one embodiment, this is achieved by receiving a scrambled digital signal from a source external to said security module, recovering at least one transport scramble control flag from the scrambled digital signal, descrambling said received scrambled signal to generate a descrambled signal, monitoring the at least one transport scramble control flag, generating a scrambling key in response to said monitored at least one transport scramble control flag, and scrambling said descrambled signal using said scrambling key to generate a re-scrambled signal.

The present invention also includes a conditional access system comprising a host device and a security device coupled to the host device, such that the security device includes at least one transport scramble control flag monitoring circuit.

DETAILED DESCRIPTION

When a conditional access (CA) device (for example, a smart card (SC) or a security module) receives a transmitted or broadcast signal (i.e., a program or event) that is scrambled, the CA device may be used to descramble the signal. The National Renewable Security Standard (NRSS) provides a means for implementing renewable security in connection with smart cards employed with digital consumer electronics (CE) devices, such as, digital television receivers (DTVs), digital video cassette recorders (DVCRs) and separate devices or "boxes" that may be located on top of, or coupled to, a television receiver, i.e., set-top boxes (STBs).

A potential problem with the NRSS architecture is that the audio/visual (A/V) stream that is sent back to the CE device from the smart card (whether in-the-clear or scrambled) needs to be effectively protected. This provides a point in which the security of the CA system could be breached because one could monitor and tap the output of the smart card and use a data capturing device to record all the plaintext data. If scrambled, the recorded data may then be descrambled through known methods and the plaintext recovered.

The present invention provides an improvement to protect the connection between the smart card and the CE device. Such smart cards include ISO 7816 cards having a card body with a plurality of terminals arranged on a surface in compliance with National Renewable Security Standard (NRSS) Part A or PCMCIA cards complying with NRSS Part B.

Figure 1:
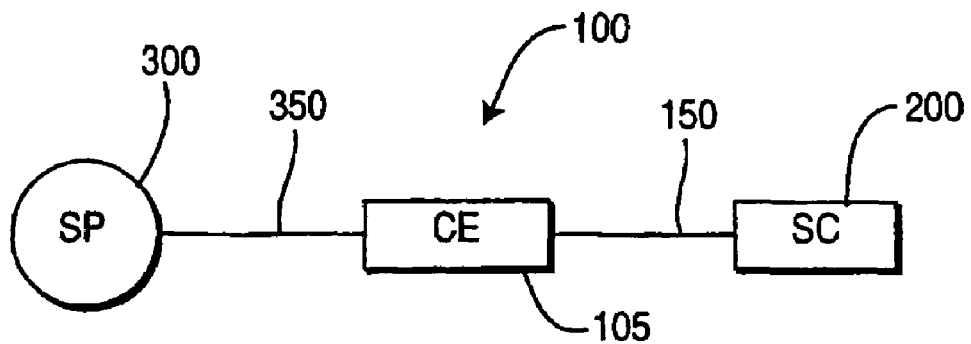
FIG. 1 is a block diagram of conditional access system according to an exemplary embodiment of the present invention.

In FIG. 1, a system 10 for protecting the A/V stream of CE device 100 which employs NRSS smart card (smart card) 200 is depicted. Such CE or "host" devices 100 include, but are not limited to, DTVs, DVCRs or STBs. Smart Card 200 is inserted into, or coupled to, a smart card reader 105 included in, or coupled to, host device 100; bus 150, internal to host device 100, interconnects host device 100 and smart card 200 thereby permitting the transfer of data therebetween. Host device 100 is connected to a cable, satellite or broadcast service provider (SP) 300 via a link 350. The protection system of the present invention will be described in relation to system 10 as shown in FIGS. 1 and 2.

For the protection of the NRSS interface (e.g., the return path from the smart card 200 to the host device 100), A/V data processing in accordance with this invention preferably includes re-scrambling the plaintext A/V data in the smart card 200 before transmission back to the host device 100. To facilitate this protection, a Transport Scramble Control Flag (TSCF) within the A/V bitstream may be modified before transmission of the re-scrambled signal back to the host device 100. In the MPEG-2 standard for example, each A/V bitstream (packet) includes a 'header' section which precedes the actual A/V content. This header section typically contains two (2) bits which correspond to a TSCF of the bitstream. No matter which standard the A/V content complies with (e.g., MPEG-2, MPEG-4, etc.), in the exemplary embodiment of the present invention, one of these TSCF bits indicates whether the following A/V content is scrambled (e.g., a logic "1" for scrambled, and a logic "0" for unscrambled), and the other bit indicates which of two key locations (e.g., KEY0, KEY1) holds the proper key for descrambling the A/V content.

Figure 2:
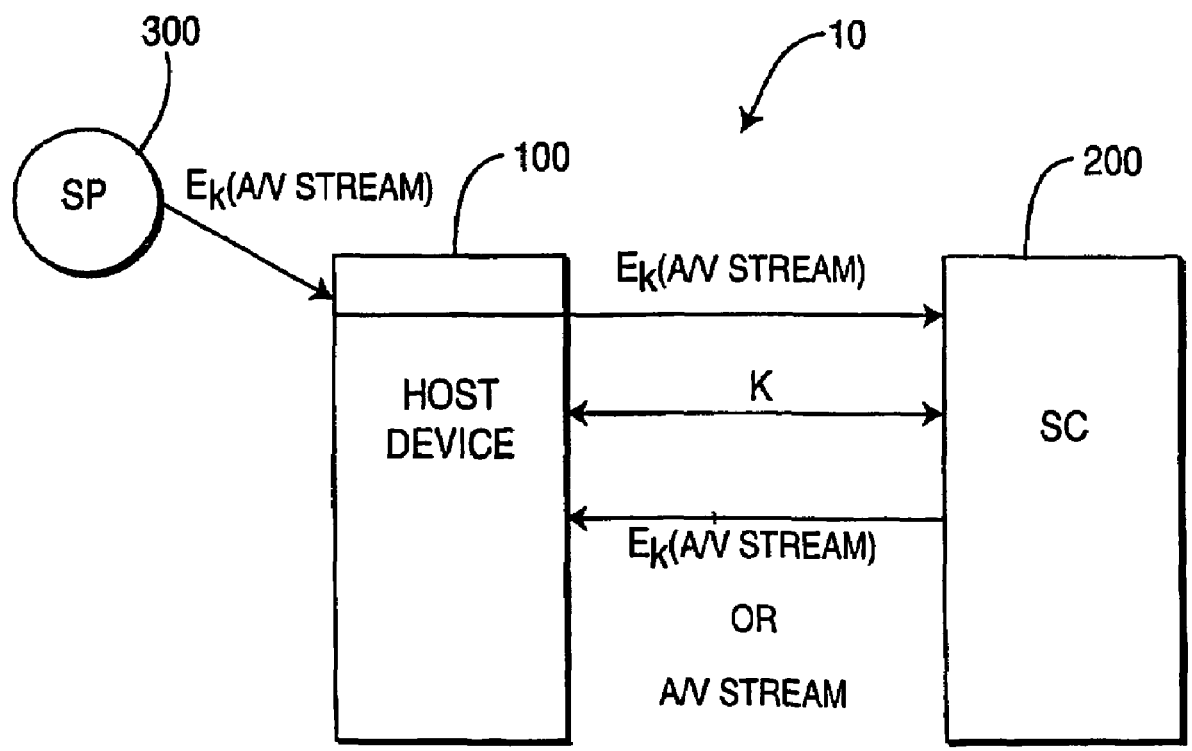
FIG. 2 is a block diagram of the conditional access system shown in FIG. 1, showing signal flow in more detail.
Figure 3:
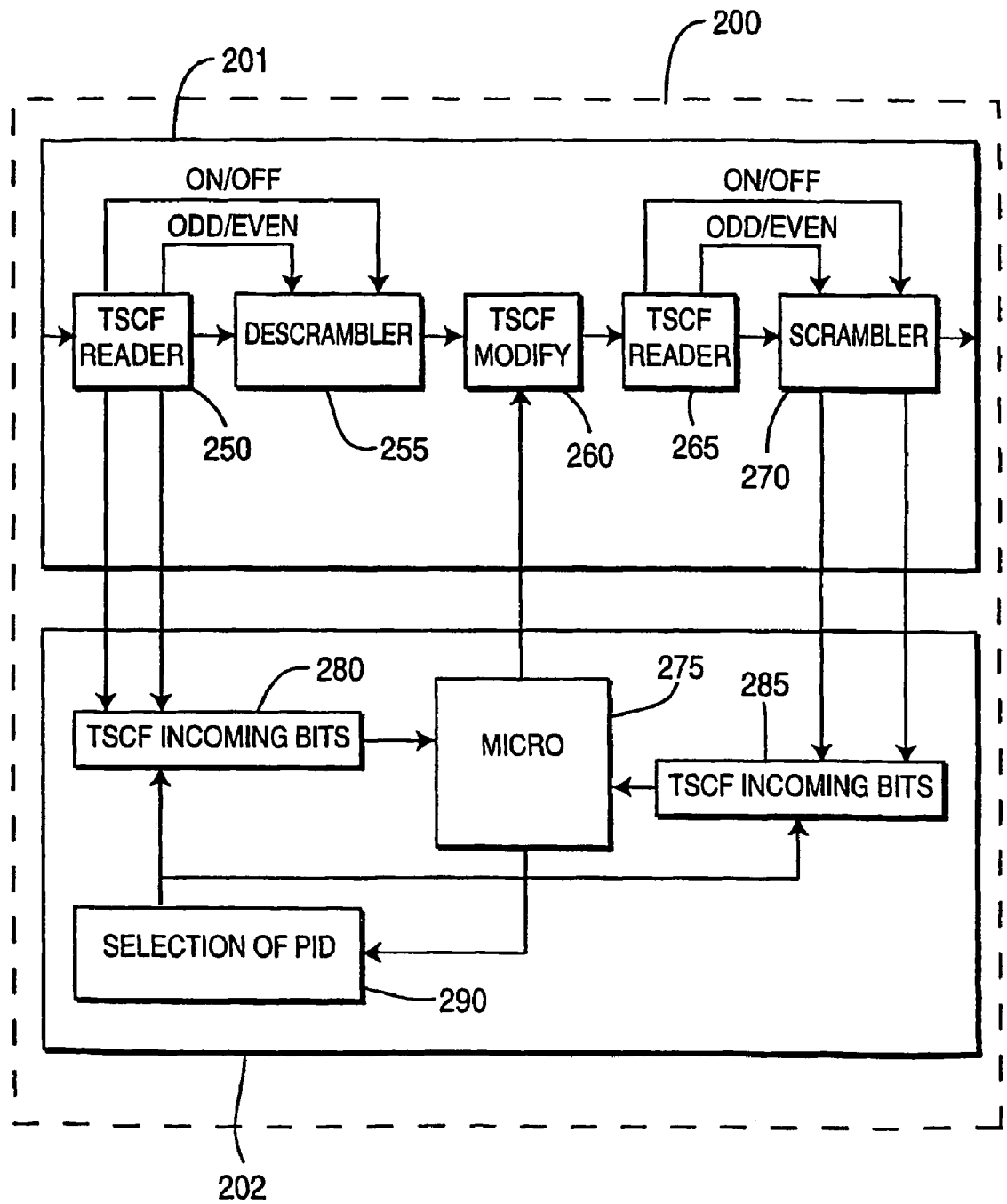
FIG. 3 is a block diagram showing the smart card of FIG. 2 in more detail.

FIGS. 2 and 3 show the conditional access system 10 according to an exemplary embodiment of the present invention. As described above, the system includes a host device 100 (e.g., DTV), a smart card 200 and a service provider 300. In operation, the service provider 300 sends a scrambled A/V stream $E_K$ (A/V Stream) to the host device 100. The host device 100, in turn, provides the scrambled A/V stream $E_K$ (A/V Stream) to the smart card 200 for descrambling.

Although the scrambled A/V stream is referenced as "$E_K$ (A/V Stream)" where "K" is the key used for scrambling, it will be noted that "K" may comprise a plurality of different keys, such as keys selected from key sets KEY0 and KEY1 described below. However, at any one time, key sets KEY0 and KEY1 contain only one key each, such keys being changed periodically giving rise to a plurality of keys in each set. As explained in detail below, the particular key utilized to scramble the content (whether from key set KEY0 or KEY1) may be selected at the service provider 300 and communicated to the smart card 200 through a secure protocol.

As discussed above, the scrambled A/V stream $E_K$ (A/V Stream) includes a header portion that is not part of the A/V content but which includes at least one Transport Scramble Control Flag (TSCF). The TSCF preferably identifies both whether the A/V stream is scrambled, and which particular key has been used for scrambling. As explained in detail below with respect to FIG. 3, the smart card 200 reads the TSCF, descrambles the A/V content, and then preferably re-scrambles the A/V content before transmitting it back to the host device 100 (e.g. DTV). Although re-scrambling of the A/V content before transmission from the smart card 200 back to the host device 100 provides additional security for the A/V content, re-scrambling is not required by the present invention as shown in FIG. 2 by the alternative unscrambled stream "A/V stream".

FIG. 3 shows the smart card 200 in more detail. The smart card 200 comprises a descrambling section 201 including a first TSCF reader circuit 250, a descrambler 255, a TSCF modify circuit 260, a second TSCF reader circuit 265, and a re-scrambler 270. The smart card 200 also comprises a TSCF monitoring section 202 including a microprocessor 275, a TSCF input circuit 280, a TSCF output circuit 285, and a program selection circuit 290.

In operation, A/V content typically enters the host device 100 in a scrambled format (although it may enter the host device unscrambled in certain circumstances). The initial scrambling of the content is accomplished by either a first key selected from a first set of keys which will be referred to herein as KEY0, or by a second key selected from a second set of keys which will be referred to herein as KEY1. As noted above, both key sets KEY0 and KEY1 are represented in FIG. 2 by the reference letter "K". This scrambled A/V content $E_K$ (A/V Stream) is then passed to the smart card 200 where it is descrambled by the appropriate key (e.g., a key from either KEY0 or KEY1). Particularly, the scrambled A/V stream $E_K$ (A/V Stream) from the host device 100 is received by the first TSCF reader circuit 250 of the smart card 200 which reads the TSCF from the A/V stream and begins the descrambling process. The descrambled content may then be re-scrambled in the smart card 200 (in re-scrambler 270) and sent back to the host device 100. The re-scrambling may be accomplished by a key from the same key set as was used for initial scrambling (it may even comprise the same exact key), or by a key which is from a different set than the key used to initially scramble the A/V content (e.g., if initial scrambling is accomplished by a key from KEY0, re-scrambling may be accomplished by a key from KEY1). If re-scrambling is accomplished by a different key within the same key set (e.g., KEY0), those of ordinary skill in the art will recognize that it will take some specified amount of time to transmit the different (new) key from the host device 100 to the smart card 200 for use. It should be noted that although the above discussion concerns two keys sets KEY0, KEY1, it will be recognized by those of ordinary skill in the art that the implementation of any number of key sets (e.g., 3, 4, 5, etc.) are within the scope of the present invention.

Typically, the initial scrambling is accomplished as follows. First, a key from key set KEY0 is distributed from the service provider 300 to the smart card 200. This may be accomplished by many methods well known in the art, for example, an Entitlement Control Message (ECM) containing the key may be transmitted to the smart card 200 via host device 100. After a specified amount of time has elapsed, the host device 100 begins receiving A/V content scrambled using the KEY0 key, and the smart card 200 subsequently begins descrambling the content using the KEY0 key. During the time when the KEY0 key is being used, a key from key set KEY1 is selected and distributed to the smart card 200 (e.g., by ECM or other known methods). After a specified time has elapsed, the host device 100 begins receiving A/V content scrambled using the KEY1 key, and the smart card 200 subsequently begins descrambling the content using the KEY1 key. During the time when the KEY1 key is being used, another key from the KEY0 set is selected and distributed, and the process repeats itself.

The two (2) TSCF bits in the header portion of the A/V content stream are used to carry information about whether the content is scrambled, and which key (e.g., KEY0 or KEY1) has been used to encrypt the content. If a new TSCF value (e.g., 00, 10, 01 or 11) is sent to the host device 100 before a new key is available for use, there will be a 'hole' in the content bit stream where the host device 100 and the smart card 200 do not agree on which key to use (e.g., if an KEY0 key is selected while a previous key from the KEY0 set is still in use, it is unlikely that both the host device 100 and the smart card 200 will write the key into the proper registers at exactly the same moment; thus for a short time, the mismatched keys will be in use). Because the transmission of a key from the host device 100 to the smart card 200 takes a certain time to be received by the microprocessor 275 within the smart card, processed, and then placed in the hardware registers for use, the timing of when a key may be selected by a TSCF flag, and used by the smart card, needs to be controlled.

The keys sent by the host device 100 are normally encrypted by a different method than the video content so the microprocessor 275 must decrypt the keys before using them, which takes time (e.g., 500 ms). Additionally, the TSCF flags come into the smart card 200 and must be used to process the data within a certain number of clock cycles (e.g., 0.01 ms). The particular decryption key selected by the TSCF flag must be received (and processed by the microprocessor 275) early enough to have it ready to decrypt the data when the TSCF flag selects that particular decryption key, or a 'hole' will be created in the bitsream. In particular, if the key is not ready when a new TSCF flag is received, an incorrect key is used to decrypt the data which results in non-decrypted data or unusable data.

The smart card 200 operates to check TSCF value in the incoming A/V stream (e.g., the scrambled A/V stream $E_K$ (A/V Stream) entering the smart card 200). As also explained below, the smart card 200 includes circuitry therein for modifying the TSCF value before the re-scrambled A/V stream is transmitted to the host device 100 to ensure against piracy.

The TSCF bits in the header portion of the A/V bitstream may be set to a fixed value by a microprocessor 275 in the smart card 200. For example, if the value is "00" or "01" A/V content will be sent from the smart card 200 back to the host device 100 without re-scrambling. If the value is "10" the key in location KEY0 will be used for re-scrambling, and if the value is "11" and key in location KEY1 will be used for re-scrambling.

The specifics of the descrambling and re-scrambling processes which take place within the smart card 200 are now described. As stated above, A/V content enters the descrambling section 201 of the smart card 200 and is transmitted to the first TSCF reader circuit 250. The TSCF reader circuit 250 reads the two bits of the TSCF and relays appropriate signals to the descrambler 255 for descrambling. For example, if the TSCF was "11", the TSCF reader circuit relays to the descrambler 255 that scrambling is "ON" and a key from set KEY1 has been used. The TSCF reader circuit 250 also transmits the bits of the TSCF to the TSCF input circuit 280 of the TSC-F monitoring section 202. The TSCF input circuit 280 stores these bits, and also transmits them to the microprocessor 275 for later use.

Based on the signals from the first TSCF reader circuit 250, the descrambler 255 descrambles the A/V content and transmits the entire bitstream (including the header) to the TSCF modify circuit 260. At this point, the microprocessor 275 may modify the TSCF of the bitstream. For example, if the TSCF was "11", the TSCF modify circuit 260 can alter the header portion of the bitstream so that the TSCF is changed to "10" (e.g., from scrambling "ON", KEY1 to scrambling "ON" KEY0). If the TSCF is modified by the microprocessor 275, such modification is identified by the second TSCF reader circuit 265.

As with the first TSCF reader circuit 250, the second TSCF reader circuit 265 reads the two bits of the TSCF and relays appropriate signals to the re-scrambler 270 for re-scrambling of the A/V content. As will be understood by those of ordinary skill in the art, if the first bit of the TSCF read by the second TSCF reader circuit 265 is a logic "0", no re-scrambling will take place before the A/V content is transmitted back to the host device 100. However, if the first bit of the TSCF read by the second TSCF reader circuit 265 is a logic "1", the A/V content will be re-scrambled (by a key from either KEY0 or KEY1, depending upon the second TSCF bit, and transmitted back to the host device 100.

The TSCF monitoring section 202 of the smart card operates in conjunction with the above-described descrambling section 201 as follows. The input TSCF value which is read by TSCF reader circuit 250, stored in the TSCF input circuit 280, and transmitted to the microprocessor 275 is compared within the microprocessor to the output TSCF value stored in the TSCF output circuit 285. If these respective TSCF values do not match, the microprocessor 275 will check to see if the TSCF value has been modified in the TSCF modify circuit 260. If the TSCF value has been modified, the microprocessor 275 will compare the modified TSCF value to the output TSCF value. If the modified TSCF value matches the output TSCF value, security is maintained. However, if the modified TSCF value does not match the output TSCF value, the microprocessor 275 identifies that security of the smart card has been comprised. In response to the identification of a security breach by the microprocessor 275, the microprocessor may disable the descrambler 255 of the smart card 200, provide notification to the service provider 300, or direct some other action which terminates transmission and/or viewing of the A/V bitstream.

The benefit of reading the TSCF "outgoing" bits with TSCF output circuit 285 and microprocessor 275 is additional security. If the process were allowed to run 'open loop' and bits were written without any verification, any single point of failure could compromise system security (either by hardware failure or by pirate attack). As designed, the system allows the TSCF bits to be changed, and then read and verified by the microprocessor 275.

The program selection circuit 290 of the TSCF monitoring section 202 is controlled by the microprocessor 275 such that the microprocessor specifies a program identifier (PID) for each program transmitted by the service provider 300 to the host device 100. In this manner, TSCF values for several different programs may be stored in the TSCF input circuit 280 and the TSCF output circuit 285, and thus several programs may be transmitted intermittently from the service provider 300 to the host device 100, and monitored at once.

Once the TSCF outgoing bits have been verified as authentic, the A/V content is sent from the smart card 200 back to the host device 100 (in either unscrambled or re-scrambled format). If the host device 100 is a DTV, it preferably includes therein a TSCF reader and descrambler to determine which key set (e.g., KEY0, KEY1) has been used for re-scrambling (if re-scrambling has been performed), and to descramble and display the A/V content. If the host device 100 is a STB which is coupled to a DTV, either the STB or the DTV, or both, preferably include therein a TSCF reader and descrambler to determine which key set (e.g., KEY0, KEY1) has been used for re-scrambling (if re-scrambling has been performed), and to descramble and display the A/V content.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

The invention claimed is:

1. A method for protecting the digital output signal of a security module, comprising the steps of:
    (a) receiving a scrambled digital signal from a source external to said security module;
    (b) recovering at least one transport scramble control flag from the scrambled digital signal;
    (c) generating a descrambling key in response to the transport scramble control flag;
    (d) descrambling, using said descramnbling key, said received scrambled signal to generate a descrambled signal;
    (e) monitoring the at least one transport scramble control flag;
    (f) generating a scrambling key in response to said monitored at least one transport scramble control flag; and,
    (g) scrambling said descrambled signal using said scrambling key to generate a rescrambled signal.

2. The method of claim 1, comprising the further step of:
    (h) providing said rescrambled signal to said external source.

3. The method of claim 1, wherein the step of recovering at least one transport scramble control flag comprises recovering the at least one transport scramble control flag from a header portion of the scrambled digital signal.

4. The method of claim 1, wherein the step of monitoring the at least one transport scramble control flag comprises one selected from the group of: changing the value of the at least one transport scramble control flag or maintaining the value of the at least one transport scramble control flag.

5. A conditional access system comprising:
a host device; and
a security device coupled to the host device, wherein the security device comprises at least one transport scramble control flag monitoring circuit for monitoring at least one transport scramble control flag transmitted from the host device to the security device, and generating a scrambling key in response thereto.

6. A conditional access system comprising:
a host device; and
a security device coupled to the host device, wherein the security device comprises at least one transport scramble control flag monitoring circuit for monitoring at least one transport scramble control flag transmitted from the host device to the security device, and generating a scrambling key in response thereto, wherein the security device further comprises;
a first transport scramble control flag reader circuit;
a descrambler coupled to the first transport scramble control flag reader circuit;
a second transport scramble control flag reader circuit; and,
a rescrambler coupled to the second transport scramble control flag reader circuit.

7. The conditional access system of claim 6, wherein the at least one transport scramble control flag monitoring circuit is coupled between the descrambler and the second transport scramble control flag reader circuit.

8. The conditional access system of claim 5, wherein at least one transport scramble control flag monitoring circuit is adapted to modify the at least one transport scramble control flag.

9. The conditional access system of claim 5, wherein the security device further comprises:
a input transport scramble control flag circuit;
an output transport scramble control flag circuit; and,
a microprocessor for comparing at least one input transport scramble control flag to at least one output transport scramble control flag.

10. The conditional access system of claim 6, wherein the security device further comprises:
a input transport scramble control flag circuit;
an output transport scramble control flag circuit; and,
a microprocessor for comparing at least one input transport scramble control flag to at least one output transport scramble control flag.

11. A method for protecting the digital output signal of a security module, comprising the steps of:
(a) receiving a digital signal from a source external to said security module;
(b) recovering at least one transport scramble control flag from the digital signal;
(c) monitoring the at least one transport scramble control flag within the security module; and,
(d) verifying the at least one transport scramble control flag at the output of the security module.

12. The method of claim 11, wherein the step of verifying the at least one transport scramble control flag at the output of the security module comprises comparing the at least transport scramble control flag at the output to the at least one transport scramble control flag received at the input of the security module.

13. The method of claim 11, wherein the digital signal comprises a scrambled digital signal.

14. A method for protecting the digital output signal of a security module, comprising the steps of:
(a) receiving a digital signal from a source external to said security module;
(b) inserting at least one transport scramble control flag into the digital signal within the security module;
(c) monitoring the at least one transport scramble control flag within the security module; and,
(d) verifying the at least one transport scramble control flag at the output of the security module.

* * * * *